(12) United States Patent
Fan et al.

(10) Patent No.: US 9,817,278 B2
(45) Date of Patent: Nov. 14, 2017

(54) LCD PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yuguang Fan, Beijing (CN); Shichao Wang, Beijing (CN); Yuekai Gao, Beijing (CN); Dongchao Li, Beijing (CN); Jian Li, Beijing (CN); Weixin Meng, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 196 days.

(21) Appl. No.: 14/744,811

(22) Filed: Jun. 19, 2015

(65) Prior Publication Data
US 2016/0291374 A1 Oct. 6, 2016

(30) Foreign Application Priority Data

Mar. 30, 2015 (CN) ...................... 2015 2 0186412 U

(51) Int. Cl.
G02F 1/1339 (2006.01)
(52) U.S. Cl.
CPC ................ *G02F 1/13394* (2013.01); *G02F 2001/13396* (2013.01); *G02F 2001/13398* (2013.01)

(58) Field of Classification Search
CPC ............................................. G02F 2001/13396
See application file for complete search history.

(56) References Cited

U.S. PATENT DOCUMENTS

| | | | |
|---|---|---|---|
| 7,061,569 B2* | 6/2006 | Yun ..................... | G02F 1/13394 349/156 |
| 7,196,465 B2* | 3/2007 | Park ..................... | H01L 27/3253 257/E27.12 |
| 9,170,457 B2* | 10/2015 | Choi ................. | G02F 1/133512 |
| 2004/0114087 A1* | 6/2004 | Cho ................... | G02F 1/133514 349/155 |
| 2006/0152668 A1* | 7/2006 | Jang ..................... | G02F 1/1339 349/156 |
| 2007/0121051 A1* | 5/2007 | Yokoyama .......... | G02F 1/13394 349/156 |

(Continued)

*Primary Examiner* — Jia Pan
(74) *Attorney, Agent, or Firm* — Blakely Sokoloff Taylor & Zafman LLP

(57) ABSTRACT

The present invention discloses a LCD panel and a display device, by removing the spacers in the frame area of the prior art LCD panel, i.e. arranging pixel spacers only in the display area, or by setting the distance from the end of the peripheral spacer far away from the substrate on which the peripheral spacer is located to the substrate base of this substrate such that it is less than the distance from the end of the pixel spacer far away from the substrate on which the pixel spacer is located to the substrate base of the latter substrate, the gap in the frame area of the LCD panel is reduced, thus mitigating or avoiding upwarp of the rim of the LCD panel caused by a higher gap of the LCD panel, which in turn prevents the undesirable phenomenon that the rim of the LCD panel appears yellow when displaying.

15 Claims, 4 Drawing Sheets

(56) References Cited

U.S. PATENT DOCUMENTS

| | | | |
|---|---|---|---|
| 2007/0153214 A1* | 7/2007 | Park | G02F 1/13394 349/155 |
| 2008/0088787 A1* | 4/2008 | Yim | G02F 1/1339 349/156 |
| 2009/0147208 A1* | 6/2009 | Tatemori | G02F 1/13394 349/156 |
| 2009/0290117 A1* | 11/2009 | Watanabe | G02F 1/133305 349/153 |
| 2013/0050619 A1* | 2/2013 | Kim | G02F 1/13394 349/106 |
| 2013/0308084 A1* | 11/2013 | Niwano | G02F 1/1339 349/155 |
| 2014/0043549 A1* | 2/2014 | Taniguchi | G02F 1/13394 349/15 |

\* cited by examiner

LCD PANEL AND DISPLAY DEVICE

The present application claims the benefit of Chinese Patent Application No. 201520186412.9, filed Mar. 30, 2015, the entire disclosures of which are incorporated herein by reference.

FIELD OF THE INVENTION

The present invention relates to the field of display technology, particularly to a liquid crystal display (LCD) panel and a display device.

BACKGROUND OF THE INVENTION

The LCD panel mainly comprises an array substrate and an opposite substrate arranged oppositely, as well as liquid crystal molecules between the array substrate and the opposite substrate. Generally, the LCD panel may be divided into a display area and a frame area surrounding the display area. The display area is mainly used for transmitting light selectively by controlling electric field, thereby achieving image display, and the frame area is mainly used to arrange peripheral circuits and coat frame glue to seal the liquid crystal within the display area.

In order to ensure a certain gap between the two substrates, in the prior art LCD panel, spacers PS of the same height between the array substrate 1 and the opposite substrate 2 are arranged in both the display area A and the frame area B, as shown in FIG. 1. However, since peripheral circuits such as gate driver on array (GOA) are typically arranged in the frame area B, so that the thickness of the film layer on the array substrate 1 within the frame area B is higher than that of the film layer within the display area A, which leads to that the gap of LCD panel in the frame area is greater than that in the display area, such that the rim of the LCD panel is easy to upwarp, which in turn causes undesirable phenomenon that the rim of the LCD panel appears yellow when displaying.

SUMMARY OF THE INVENTION

In view of above, a LCD panel and a display device are provided by embodiments of the present invention, for mitigating or eliminating the undesirable phenomenon that the rim of the LCD panel appears yellow when displaying due to the fact that the rim of the LCD panel is easy to upwarp in the prior art.

An embodiment of the present invention provides a LCD panel having a display area and a frame area surrounding the display area, the LCD panel comprising an array substrate and an opposite substrate arranged oppositely, the LCD panel further comprises:

a pixel spacer that is between the array substrate and the opposite substrate and only located in the display area; or a pixel spacer in the display area and a peripheral spacer in the frame area at the side of the array substrate facing the opposite substrate, a distance from the end of the peripheral spacer without stretching and compressing close to the opposite substrate to the substrate base of the array substrate being referred to as a first distance, and a distance from the end of the pixel spacer without stretching and compressing close to the opposite substrate to the substrate base of the array substrate being referred to as a second distance, wherein the first distance is less than the second distance; or a pixel spacer in the display area and a peripheral spacer in the frame area at the side of the opposite substrate facing the array substrate; a distance from the end of the peripheral spacer without stretching and compressing close to the array substrate to the substrate base of the opposite substrate being referred to as a third distance, and a distance from the end of the pixel spacer without stretching and compressing close to the array substrate to the substrate base of the opposite substrate being referred to as a fourth distance, wherein the third distance is less than the fourth distance.

Further, in the LCD panel provided by the embodiment of the present invention, the first distance may be less than the second distance at least by 0.2 μm, or the third distance may be less than the fourth distance at least by 0.2 μm.

According to a LCD panel provided by another embodiment of the present invention, the height of the peripheral spacer without stretching and compressing may be smaller than that of the pixel spacer without stretching and compressing.

In an embodiment, when both the pixel spacer and the peripheral spacer are located on the side of the opposite substrate facing the array substrate, the side of the opposite substrate facing the array substrate within the frame area is provided with several recesses, each said peripheral spacer is located in the region where each of the recesses is located; and the height of the peripheral spacer without stretching and compressing may be smaller than or equal to that of the pixel spacer without stretching and compressing.

In another embodiment, when both the pixel spacer and the peripheral spacer are located on the side of the array substrate facing the opposite substrate, the side of the array substrate facing the opposite substrate within the frame area is provided with several recesses, each said peripheral spacer is located in the region where each of the recesses is located, and the height of the peripheral spacer without stretching and compressing may be smaller than or equal to that of the pixel spacer without stretching and compressing.

In an embodiment, the depth of the recess may be between 0.1 μm-2.5 μm.

In an LCD panel according to another embodiment of the present invention, the pixel spacer may comprise a primary spacer and an auxiliary spacer, the peripheral spacer may comprise the auxiliary spacer only; the height of the primary spacer without stretching and compressing is greater than that of the auxiliary spacer without stretching and compressing.

Further, in another embodiment, distribution density of the auxiliary spacers in the frame area can be lower than distribution density of the auxiliary spacers in the display area.

Accordingly, a display device is also provided by an embodiment of the present invention, which may comprise any one of the LCD panels above provided by various embodiments of the present invention.

In an embodiment, a display device comprising a LCD panel is provided, the LCD panel having a display area and a frame area surrounding the display area and comprising an array substrate and an opposite substrate arranged oppositely, the LCD panel further comprises:

a pixel spacer that is between the array substrate and the opposite substrate and only located in the display area; or a pixel spacer in the display area and a peripheral spacer in the frame area at the side of the array substrate facing the opposite substrate, a distance from the end of the peripheral spacer without stretching and compressing close to the opposite substrate to the substrate base of the array substrate being referred to as a first distance, and a distance from the end of the pixel spacer without stretching and compressing close to the opposite substrate to the substrate base of the array substrate being referred to as a second distance, wherein the first distance is less than the second distance; or a pixel spacer in the display area and a peripheral spacer in the frame area at the side of the opposite substrate facing the array substrate; a distance from the end of the peripheral spacer without stretching and compressing close to the array substrate to the substrate base of the opposite substrate being referred to as a third distance, and a distance from the end of the pixel spacer without stretching and compressing close to the array substrate to the substrate base of the opposite substrate being referred to as a fourth distance, wherein the third distance is less than the fourth distance.

Further, the first distance may be less than the second distance at least by 0.2 μm, or the third distance may be less than the fourth distance at least by 0.2 μm.

In an embodiment, the height of the peripheral spacer without stretching and compressing may be smaller than that of the pixel spacer without stretching and compressing.

In an embodiment, when both the pixel spacer and the peripheral spacer are located on the side of the opposite substrate facing the array substrate, the side of the opposite substrate facing the array substrate within the frame area is provided with several recesses, each said peripheral spacer is located in the region where each of the recesses is located; and the height of the peripheral spacer without stretching and compressing may be smaller than or equal to that of the pixel spacer without stretching and compressing.

In an embodiment, when both the pixel spacer and the peripheral spacer are located on the side of the array substrate facing the opposite substrate, the side of the array substrate facing the opposite substrate within the frame area is provided with several recesses, each said peripheral spacer is located in the region where each of the recesses is located, and the height of the peripheral spacer without stretching and compressing may be smaller than or equal to that of the pixel spacer without stretching and compressing.

In an embodiment, the depth of the recess may be between 0.1 μm-2.5 μm.

In an embodiment, the pixel spacer comprises a primary spacer and an auxiliary spacer, the peripheral spacer comprises the auxiliary spacer only; the height of the primary spacer without stretching and compressing is greater than that of the auxiliary spacer without stretching and compressing, and the first distance is a distance from the end of the auxiliary spacer used as the peripheral spacer without stretching and compressing close to the opposite substrate to the substrate base of the array substrate, the second distance is a distance from the end of the primary space without stretching and compressing close to the opposite substrate to the substrate base of the array substrate, or the third distance is a distance from the end of the auxiliary spacer used as the peripheral spacer without stretching and compressing close to the array substrate to the substrate base of the opposite substrate, the fourth distance is a distance from the end of the primary spacer without stretching and compressing close to the array substrate to the substrate base of the opposite substrate.

In an embodiment, distribution density of the auxiliary spacers in the frame area may be lower than distribution density of the auxiliary spacers in the display area.

For the LCD panels and display devices provided by various embodiments above, by removing the spacers in the frame area of the prior art LCD panel, i.e. arranging pixel spacers only in the display area, or by setting the distance from the end of the peripheral spacer far away from the substrate on which the peripheral spacer is located to the substrate base of this substrate such that it is less than the distance from the end of the pixel spacer far away from the substrate on which the pixel spacer is located to the substrate base of the latter substrate, the gap in the frame area of the LCD panel is reduced, thus mitigating or avoiding upwarp of the rim of the LCD panel caused by a higher gap of the LCD panel, which in turn prevents the undesirable phenomenon that the rim of the LCD panel appears yellow when displaying.

DETAILED DESCRIPTION OF THE INVENTION

In the LCD panel of the prior art, in order to ensure a certain gap between the array substrate and the opposite substrate, spacers of the same height between the two substrates are arranged in both the display area and the frame area. However, in practical application, it easily occurs that the rim of the LCD panel appears yellow when displaying. Research shows that it is due to the fact stated as follows: in the LCD panel of the prior art, generally peripheral circuits with complicated structure are arranged in the frame area, therefore, the thickness of the film layer on the array substrate within the frame area is thicker than that of the film layer on the array substrate within the display area, also spacers within the display area and the frame area are of the same height because they are formed by the same process in normal circumstances, hence the gap of the LCD panel within the frame area is greater than the gap within the display area, such that the rim of the LCD panel is easy to upwarp, which in turn causes the undesirable phenomenon that the rim of the LCD panel appears yellow when displaying.

In consideration of problems described above, a LCD panel and a display device are provided by the embodiments of the present invention for mitigating or solving problems above.

Next, specific implementations of the LCD panel and the display device provided by the embodiments of the present invention will be illustrated in detail with reference to the figures. The shape and size of the areas shown in the figures do not reflect actual proportion of the LCD panel, which are rather intended to schematically illustrate the disclosure of the embodiments of the present invention.

Figure 1:
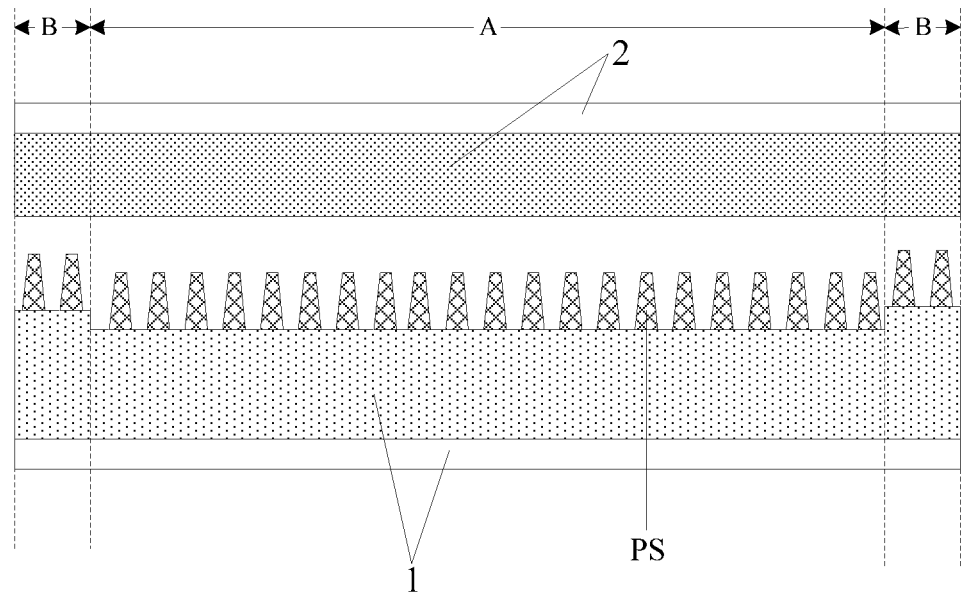
FIG. 1 is a structural schematic view of an existing LCD panel.
Figure 2A:
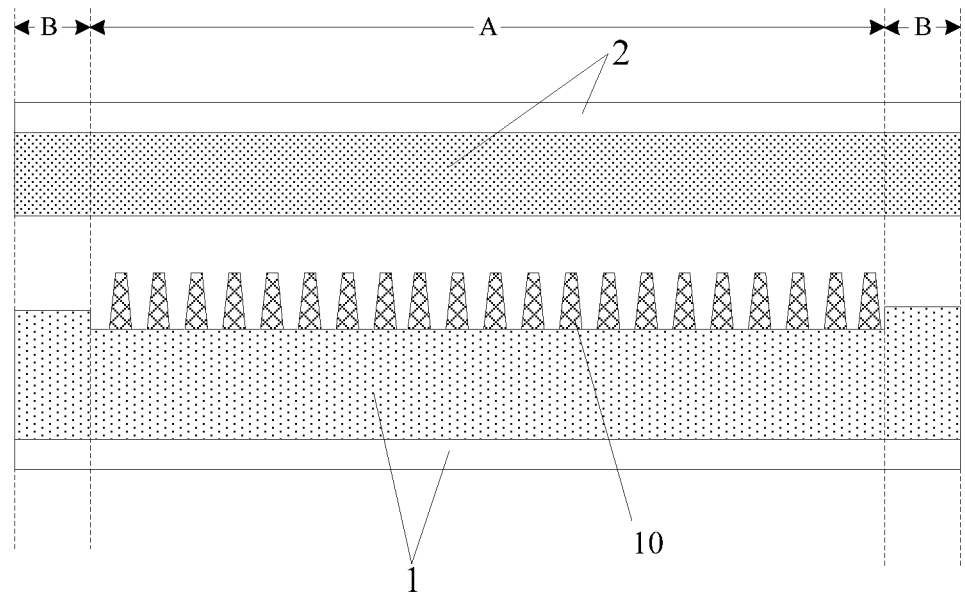
FIG. 2a is a structural schematic view of the LCD panel according to an embodiment of the invention.
Figure 2B:
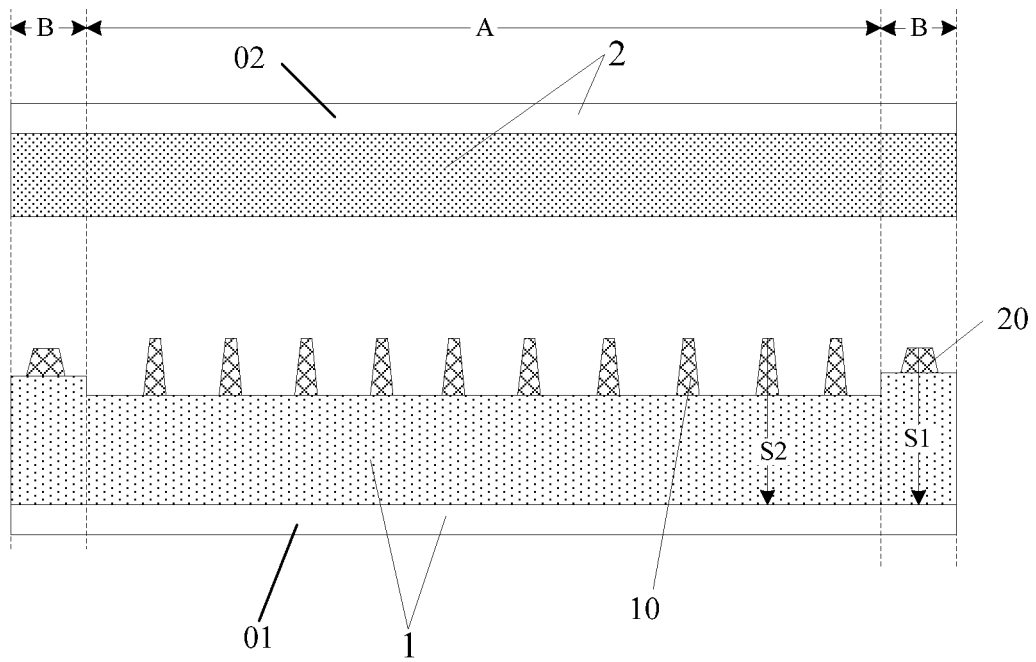
FIG. 2b is a structural schematic view of the LCD panel according to another embodiment of the invention.
Figure 2C:
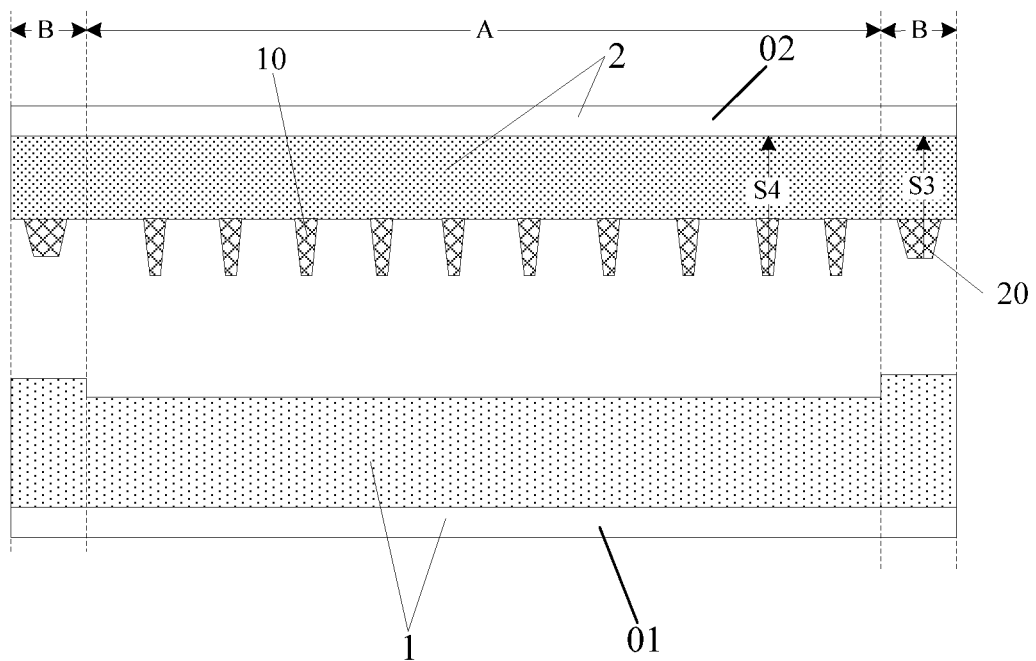
FIG. 2c is a structural schematic view of the LCD panel according to yet another embodiment of the invention.

As shown in FIGS. 2a to 2c, the LCD panels provided by various embodiments of the present invention have a display area A and a frame area B surrounding the display area A, the LCD panel may comprise an array substrate 1 and an opposite substrate arranged oppositely.

In one embodiment as shown in FIG. 2a, the LCD panel further comprises pixel spacers 10 that are between the array substrate 1 and the opposite substrate 2 and only located in the display area A. In this way, since no spacer is present in the frame area, the gap in the frame area is smaller after box alignment for the LCD panel, thereby the rim of the LCD panel will not upwarp, which in turn mitigates or avoids the undesirable phenomenon that the rim of the LCD panel appears yellow when displaying. However, anti-extrusion capability of such LCD panel may be poor because there is no spacer in the frame area.

In a LCD panel provided by another embodiment of the present invention as shown in FIG. 2b, in addition to the array substrate 1 and the opposite substrate 2 arranged oppositely, the LCD panel further comprise pixel spacers 10 in the display area A and peripheral spacers 20 in the frame area B. Specifically, both the pixel spacers 10 and the peripheral spacers 20 can be attached to the array substrate 1, and can also be attached to the opposite substrate 2, which is not limited specifically herein.

When both the pixel spacers and the peripheral spacers are attached to the array substrate, as shown in FIG. 2b, the LCD panel comprises the array substrate 1 and the opposite substrate 2 arranged oppositely, and further comprises the pixel spacers 10 in the display area A and the peripheral spacers 20 in the frame area at the side of the array substrate 1 facing the opposite substrate 2. The distance from the end of the peripheral spacer 20 without stretching and compressing close to the opposite substrate 2 to the substrate base 01 of the array substrate 1 is referred to as a first distance S1, and the distance from the end of the pixel spacer 10 without stretching and compressing close to the opposite substrate 2 to the substrate base 01 of the array substrate 1 is referred to as a second distance S2, the first distance S1 is less than the second distance S2. In this way, since the first distance is less than the second distance, the gap in the frame area can be reduced after box alignment for the LCD panel, thereby mitigating or avoiding the undesirable phenomenon that the rim of the LCD panel appears yellow when displaying.

Alternatively, when both the pixel spacers and the peripheral spacers are attached to the opposite substrate, as shown in FIG. 2c, the LCD panel comprises the array substrate 1 and the opposite substrate 2 arranged oppositely, and further comprises the pixel spacers 10 in the display area A and the peripheral spacers 20 in the frame area at the side of the opposite substrate 2 facing the array substrate 1. The distance from the end of the peripheral spacer 20 without stretching and compressing close to the array substrate 1 to the substrate base 02 of the opposite substrate 2 is referred to as a third distance S3, and the distance from the end of the pixel spacers 10 without stretching and compressing close to the array substrate 1 to the substrate base 02 of the opposite substrate 2 is referred to as a fourth distance S4, the third distance S3 is less than the fourth distance S4. In this way, since the third distance is less than the fourth distance, the gap in the frame area can be reduced after box alignment for the LCD panel, thereby mitigating or avoiding the undesirable phenomenon that the rim of the LCD panel appears yellow when displaying.

For the LCD panels above provided by the embodiments of the present invention, by removing the spacers in the frame area of the prior art LCD panel, i.e. arranging pixel spacers only in the display area, or by setting the distance from the end of the peripheral spacer far away from the substrate on which the peripheral spacer is located to the substrate base of this substrate such that it is less than the distance from the end of the pixel spacer far away from the substrate on which the pixel spacer is located to the substrate base of the substrate, the gap in the frame area of the LCD panel is reduced, thus mitigating or avoiding upwarp of the rim of the LCD panel caused by a higher entire gap, which in turn prevents the undesirable phenomenon that the rim of the LCD panel appears yellow when displaying.

It is noted that, all the figures in the application are directed to illustrate embodiments of the present invention by way of examples in which structural schematic diagrams of the LCD panel before box alignment are shown. The array substrates in various embodiments of the present invention may comprise a substrate base and respective film layers on the substrate base, likewise, the opposite substrates may comprise a substrate base and respective film layers on the substrate base, and such film layers in the array substrate and the opposite substrate are the same as that of the prior art, which is not described in detail herein.

In the LCD panels above provided by embodiments of the present invention, when both the pixel spacers and peripheral spacers are on the side of the array substrate facing the opposite substrate, the first distance may be less than the second distance at least by 0.2 μm. Alternatively, when both the pixel spacers and peripheral spacers are on the side of the opposite substrate facing the array substrate, the third distance may be less than the fourth distance at least by 0.2 μm.

According to an embodiment of the present invention, the distance from the end of the peripheral spacer far away from the substrate on which the peripheral spacer is located to the substrate base of this substrate is less than the distance from the end of the pixel spacer far away from the substrate on which the pixel spacer is located to the substrate base of the substrate, which can be embodied as embodiments described as follows.

The height of the peripheral spacer 20 without stretching and compressing may be smaller than that of the pixel spacer 10 without stretching and compressing, as shown in the FIGS. 2b and 2c.

Figure 3A:
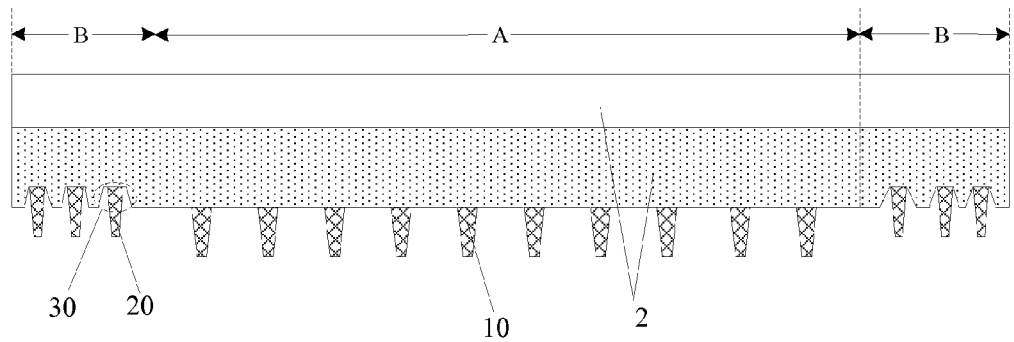
FIG. 3a is a structural schematic view of the LCD panel according to yet another embodiment of the invention.

Alternatively, in another embodiment, as shown in FIG. 3a, when both the pixel spacers 10 and the peripheral spacers 20 are located on the side of the opposite substrate 2 facing the array substrate 1, the side of the opposite substrate 2 facing the array substrate 1 within the frame area B is provided with several recesses 30, each peripheral spacer 20 is located in the region where respective recess 30 is located. The height of the peripheral spacer 20 without stretching and compressing may be smaller than or equal to that of the pixel spacer 10 without stretching and compressing.

Figure 3B:
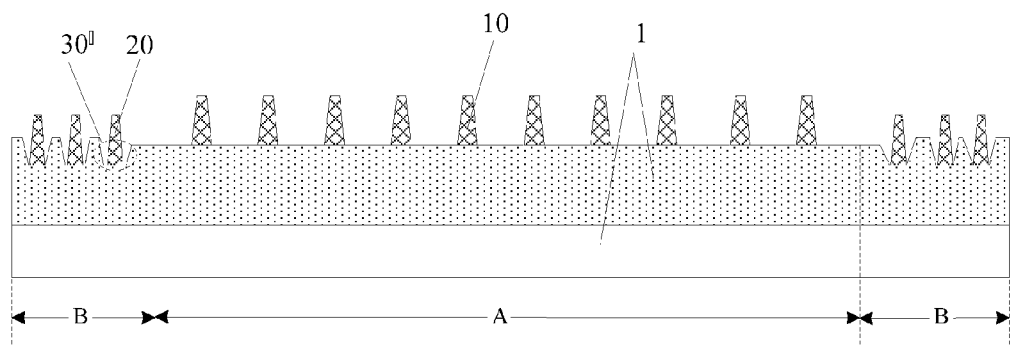
FIG. 3b is a structural schematic view of the LCD panel according to yet another embodiment of the invention.

Alternatively, as shown in FIG. 3b, when both the pixel spacers 10 and the peripheral spacers 20 are located on the side of the array substrate 1 facing the opposite substrate 2, the side of the array substrate 1 facing the opposite substrate 2 within the frame area B is provided with several recesses 30', each peripheral spacer 20 is located in the region where respective recess 30' is located. The height of the peripheral spacer 20 without stretching and compressing may be smaller than or equal to that of the pixel spacer 10 without stretching and compressing.

In the LCD panel above provided by an embodiment of the present invention, the depth of the recess may be between 0.1 μm-2.5 μm.

According to another embodiment of the present invention, the spacers in the display area may comprise a primary spacer and an auxiliary spacer, the spacers in the frame area may include an auxiliary spacer only. The height of the primary spacer without stretching and compressing can be greater than that of the auxiliary spacer without stretching and compressing, so as to decrease the height of the spacers in the frame area.

Figure 4A:
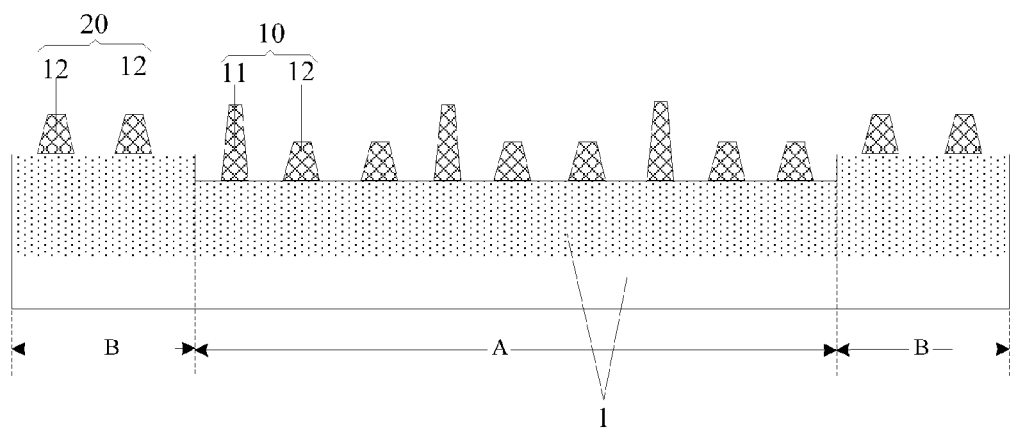
FIG. 4a is a structural schematic view of the LCD panel according to yet another embodiment of the invention.

For example, as shown in FIG. 4a, in a LCD panel provided by another embodiment of the present invention, the pixel spacer 10 may comprise a primary spacer 11 and an auxiliary spacer 12, the peripheral spacer 20 may comprise the auxiliary spacer 12 only, and the height of the primary spacer 11 without stretching and compressing can be greater than that of the auxiliary spacer 12 without stretching and compressing.

It should be understood that, the principle embodied in FIG. 4a can also be applied to other embodiments mention above. For example, it can be combined with the embodiment as shown in FIG. 2b, in this case, said first distance S1 may be the distance from the end of the auxiliary spacer 12 used as the peripheral spacer 20 without stretching and compressing close to the opposite substrate to the substrate base of the array substrate 1, said second distance S2 may be the distance from the end of the primary spacer 11 without stretching and compressing close to the opposite substrate to the substrate base of the array substrate 1.

For another example, when it is combined with the embodiment shown in FIG. 2c, said third distance may be the distance from the end of the auxiliary spacer used as the peripheral spacer without stretching and compressing close to the array substrate to the substrate base of the opposite substrate, said fourth distance may be the distance from the end of the primary spacer without stretching and compressing close to the array substrate to the substrate base of the opposite substrate.

Of course, different embodiments can be obtained by combining the principle as embodied in FIG. 4a with other embodiments mentioned herein, which will not be described in detail.

Figure 4B:
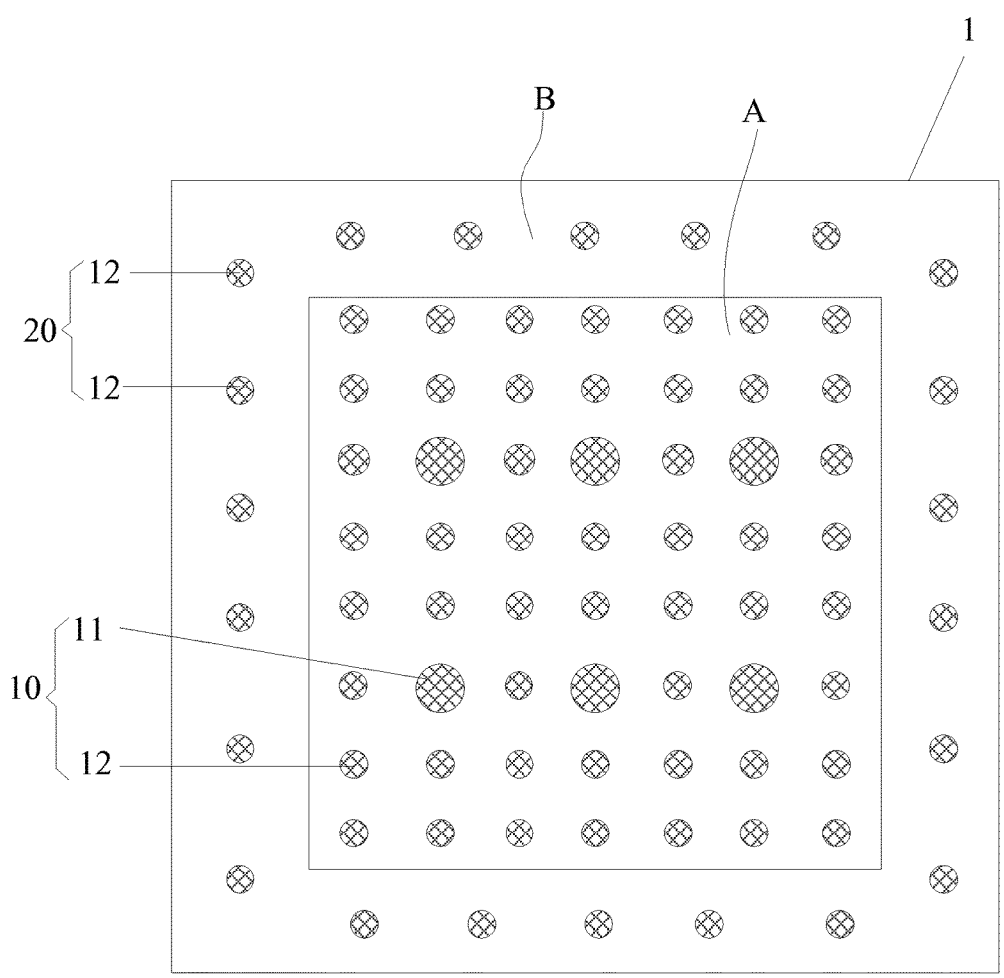
FIG. 4b is a structural schematic view of the LCD panel according to yet another embodiment of the invention.

Furthermore, in the LCD panel provided by an embodiment of the present invention, as shown in FIG. 4b, distribution density of the auxiliary spacers 12 in the frame area B may be lower than distribution density of the auxiliary spacers 12 in the display area A. In this way, support force for the frame area of the LCD panel given by the peripheral spacers can be further reduced by decreasing the distribution density.

Based on the same inventive concept, a display device is provided by an embodiment of the present invention, which may comprise any one of the LCD panels provided by various embodiments. The display device can be any product or component capable of displaying, such as a mobile phone, a tablet computer, a television, a display, a laptop, a digital photo frame, a navigator, etc. Embodiments of the display device can reference the embodiments of the LCD panel mentioned above, which is not repeated herein.

For the LCD panel and the display device provided by the embodiments of the present invention, by removing the spacers in the frame area of the prior art LCD panel, i.e. arranging pixel spacers only in the display area, or by setting the distance from the end of the peripheral spacer far away from the substrate on which the peripheral spacer is located to the substrate base of this substrate such that it is less than the distance from the end of the pixel spacer far away from the substrate on which the pixel spacer is located to the substrate base of the latter substrate, the gap in the frame area of the LCD panel is reduced, thus mitigating or avoiding upwarp of the rim of the LCD panel caused by higher entire gap, which in turn prevents the undesirable phenomenon that the rim of the LCD panel appears yellow when displaying.

Apparently, the skilled person in the art can make various modifications and variants to the embodiments of the present invention without departing from the spirit and scope of the present invention. Thus, if these modifications and variants of the present invention fall within the scopes of the claims of the present invention and its equivalent technologies, the present invention also intends to cover these modifications and variants.

The invention claimed is:

1. A LCD panel having a display area and a frame area surrounding the display area, the LCD panel comprising an array substrate and an opposite substrate arranged oppositely, wherein the LCD panel further comprises:
    a pixel spacer in the display area and a peripheral spacer in the frame area at the side of the array substrate facing the opposite substrate, a distance from an end of the peripheral spacer without stretching and compressing close to the opposite substrate to the substrate base of the array substrate being referred to as a first distance, and a distance from an end of the pixel spacer without stretching and compressing close to the opposite substrate to the substrate base of the array substrate being referred to as a second distance, wherein the first distance is less than the second distance; or
    a pixel spacer in the display area and a peripheral spacer in the frame area at the side of the opposite substrate facing the array substrate; a distance from an end of the peripheral spacer without stretching and compressing close to the array substrate to the substrate base of the opposite substrate being referred to as a third distance, and a distance from an end of the pixel spacer without stretching and compressing close to the array substrate to the substrate base of the opposite substrate being referred to as a fourth distance, wherein the third distance is less than the fourth distance,
    wherein the pixel spacer comprises a primary spacer and an auxiliary spacer, the peripheral spacer comprises the auxiliary spacer only, the height of the primary spacer without stretching and compressing is greater than the height of the auxiliary spacer without stretching and compressing,
    wherein distribution density of the auxiliary spacers in the frame area is lower than distribution density of the auxiliary spacers in the display area.

2. The LCD panel of claim 1, wherein the first distance is less than the second distance at least by 0.2 μm; or
    the third distance is less than the fourth distance at least by 0.2 μm.

3. The LCD panel of claim 1, wherein the height of the peripheral spacer without stretching and compressing is smaller than that of the pixel spacer without stretching and compressing.

4. The LCD panel of claim 2,
    wherein the first distance is a distance from an end of the auxiliary spacer used as the peripheral spacer without stretching and compressing close to the opposite substrate to the substrate base of the array substrate, the second distance is the distance from an end of the primary space without stretching and compressing close to the opposite substrate to the substrate base of the array substrate, or
    the third distance is a distance from an end of the auxiliary spacer used as the peripheral spacer without stretching and compressing close to the array substrate to the substrate base of the opposite substrate, the fourth distance is a distance from an end of the primary spacer without stretching and compressing close to the array substrate to the substrate base of the opposite substrate.

5. A LCD panel having a display area and a frame area surrounding the display area, the LCD panel comprising an array substrate and an opposite substrate arranged oppositely, wherein the LCD panel further comprises:
   a pixel spacer in the display area and a peripheral spacer in the frame area at the side of the opposite substrate facing the array substrate; a distance from an end of the peripheral spacer without stretching and compressing close to the array substrate to the substrate base of the opposite substrate being referred to as a third distance, and a distance from an end of the pixel spacer without stretching and compressing close to the array substrate to the substrate base of the opposite substrate being referred to as a fourth distance, wherein the third distance is less than the fourth distance,
   wherein the side of the opposite substrate facing the array substrate within the frame area is provided with several recesses, each said peripheral spacer is located in the region where each of the recesses is located; and the height of the peripheral spacer without stretching and compressing is smaller than or equal to that of the pixel spacer without stretching and compressing.

6. The LCD panel of claim 5, wherein the pixel spacer comprises a primary spacer and an auxiliary spacer, the peripheral spacer comprises the auxiliary spacer only; the height of the primary spacer without stretching and compressing is greater than the height of the auxiliary spacer without stretching and compressing.

7. A LCD panel having a display area and a frame area surrounding the display area, the LCD panel comprising an array substrate and an opposite substrate arranged oppositely, wherein the LCD panel further comprises:
   a pixel spacer in the display area and a peripheral spacer in the frame area at the side of the array substrate facing the opposite substrate, a distance from an end of the peripheral spacer without stretching and compressing close to the opposite substrate to the substrate base of the array substrate being referred to as a first distance, and a distance from an end of the pixel spacer without stretching and compressing close to the opposite substrate to the substrate base of the array substrate being referred to as a second distance, wherein the first distance is less than the second distance,
   wherein the pixel spacer comprises a primary spacer and an auxiliary spacer, the peripheral spacer comprises the auxiliary spacer only, the height of the primary spacer without stretching and compressing is greater than the height of the auxiliary spacer without stretching and compressing,
   wherein distribution density of the auxiliary spacers in the frame area is lower than distribution density of the auxiliary spacers in the display area,
   wherein the side of the array substrate facing the opposite substrate within the frame area is provided with several recesses, each said peripheral spacer is located in the region where each of the recesses is located, and the height of the peripheral spacer without stretching and compressing is smaller than or equal to that of the pixel spacer without stretching and compressing.

8. The LCD panel of claim 7, wherein a depth of the recess is between 0.1 μm-2.5 μm.

9. A display device comprising a LCD panel, the LCD panel having a display area and a frame area surrounding the display area and comprising an array substrate and an opposite substrate arranged oppositely, wherein the LCD panel further comprises:
   a pixel spacer in the display area and a peripheral spacer in the frame area at the side of the array substrate facing the opposite substrate, a distance from an end of the peripheral spacer without stretching and compressing close to the opposite substrate to the substrate base of the array substrate being referred to as a first distance, and a distance from an end of the pixel spacer without stretching and compressing close to the opposite substrate to the substrate base of the array substrate being referred to as a second distance, wherein the first distance is less than the second distance; or
   a pixel spacer in the display area and a peripheral spacer in the frame area at the side of the opposite substrate facing the array substrate; a distance from an end of the peripheral spacer without stretching and compressing close to the array substrate to the substrate base of the opposite substrate being referred to as a third distance, and a distance from an end of the pixel spacer without stretching and compressing close to the array substrate to the substrate base of the opposite substrate being referred to as a fourth distance, wherein the third distance is less than the fourth distance,
   wherein the pixel spacer comprises a primary spacer and an auxiliary spacer, the peripheral spacer comprises the auxiliary spacer only, the height of the primary spacer without stretching and compressing is greater than the height of the auxiliary spacer without stretching and compressing,
   wherein distribution density of the auxiliary spacers in the frame area is lower than distribution density of the auxiliary spacers in the display area.

10. The display device of claim 9, wherein the first distance is less than the second distance at least by 0.2 μm; or
   the third distance is less than the fourth distance at least by 0.2 μm.

11. The display device of claim 9, wherein the height of the peripheral spacer without stretching and compressing is smaller than that of the pixel spacer without stretching and compressing.

12. The display device of claim 9,
   wherein the first distance is a distance from an end of the auxiliary spacer used as the peripheral spacer without stretching and compressing close to the opposite substrate to the substrate base of the array substrate, the second distance is a distance from an end of the primary space without stretching and compressing close to the opposite substrate to the substrate base of the array substrate, or
   the third distance is a distance from an end of the auxiliary spacer used as the peripheral spacer without stretching and compressing close to the array substrate to the substrate base of the opposite substrate, the fourth distance is a distance from an end of the primary spacer without stretching and compressing close to the array substrate to the substrate base of the opposite substrate.

13. A display device, comprising the LCD panel according to claim 5.

14. A display device, comprising the LCD panel according to claim 7.

15. The display device of claim 14, wherein a depth of the recess is between 0.1 μm-2.5 μm.

* * * * *